(12) United States Patent
Zhu et al.

(10) Patent No.: US 12,407,804 B2
(45) Date of Patent: Sep. 2, 2025

(54) MOTION CORRECTION FOR TIME-OF-FLIGHT DEPTH IMAGING

(71) Applicant: Microsoft Technology Licensing, LLC, Redmond, WA (US)

(72) Inventors: Ling Zhu, Jilin (CN); Sergio Ortiz Egea, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 455 days.

(21) Appl. No.: 17/654,754

(22) Filed: Mar. 14, 2022

(65) Prior Publication Data

US 2023/0291886 A1    Sep. 14, 2023

(51) Int. Cl.
  *H04N 13/268*    (2018.01)
  *H04N 13/122*    (2018.01)
  *H04N 13/128*    (2018.01)
  *H04N 13/133*    (2018.01)

(52) U.S. Cl.
  CPC ......... *H04N 13/268* (2018.05); *H04N 13/122* (2018.05); *H04N 13/128* (2018.05); *H04N 13/133* (2018.05)

(58) Field of Classification Search
  CPC .. H04N 13/268; H04N 13/122; H04N 13/128; H04N 13/133; G01S 17/36; G01S 17/894; G01S 7/4915
  USPC .......................................................... 348/46
  See application file for complete search history.

(56) References Cited

U.S. PATENT DOCUMENTS

| | | | |
|---|---|---|---|
| 2011/0188028 A1* | 8/2011 | Hui ....................... | G01S 7/4915 356/5.01 |
| 2019/0355136 A1* | 11/2019 | Ortiz Egea ............. | G06T 5/70 |
| 2020/0326426 A1* | 10/2020 | Godbaz ................... | G01S 17/26 |
| 2020/0393245 A1* | 12/2020 | Ortiz Egea .............. | G06T 5/20 |
| 2021/0405199 A1 | 12/2021 | Ortiz Egea | |
| 2023/0305123 A1* | 9/2023 | Hurwitz ................ | G01S 7/4918 |

OTHER PUBLICATIONS

"International Search Report Written Opinion Issued in PCT Application No. PCT/US22/053294", Mailed Date: May 24, 2023, 16 Pages.

"Invitation to Pay Additional Fees Issued in PCT Application No. PCT/US22/053294", Mailed Date: Mar. 31, 2023, 9 Pages.

* cited by examiner

*Primary Examiner* — Christopher S Kelley
*Assistant Examiner* — Ana Picon-Feliciano
(74) *Attorney, Agent, or Firm* — Alleman Hall & Tuttle LLP

(57) ABSTRACT

Examples are disclosed that relate to motion blur corrections for time-of-flight (ToF) depth imaging. One example provides a depth camera comprising a ToF image sensor, a logic machine, and a storage machine storing instructions executable by the logic machine to receive depth image data from the ToF image sensor, the depth image data comprising phase data and active brightness (AB) data, determine a first two-dimensional (2D) AB image corresponding to a first modulation frequency, and determine a second 2D AB image corresponding to a second modulation frequency. The instructions are further executable to determine a 2D translation based upon a comparison between the first 2D AB image and the second 2D AB image, determine corrected phase data based on the 2D translation to form corrected phase data, perform phase unwrapping on the corrected phase data to obtain a three-dimensional (3D) depth image, and output the 3D depth image.

12 Claims, 12 Drawing Sheets

MOTION CORRECTION FOR TIME-OF-FLIGHT DEPTH IMAGING

BACKGROUND

Depth sensing systems, such as time-of-flight (ToF) cameras, may be used to produce a depth image of an environment, with each pixel of the depth image representing a distance to a corresponding point in the environment. In ToF imaging, a distance to a point on an imaged surface in the environment is determined based on a length of a time interval in which light emitted by the ToF camera travels out to that point and then returns back to a sensor of the ToF camera. The raw data collected at the depth sensor is processed to produce a depth image.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to motion blur corrections for time-of-flight (ToF) depth imaging. One example provides a depth camera comprising a ToF image sensor configured to acquire depth image data at two or more illumination light modulation frequencies, a logic machine, and a storage machine storing instructions executable by the logic machine to receive depth image data for an image frame from the ToF image sensor, the depth image data comprising phase data for a first modulation frequency and phase data for a second modulation frequency of the two or more illumination light modulation frequencies, the depth image data further comprising active brightness data for the first modulation frequency and active brightness data for the second modulation frequency. The instructions are further executable to, based at least on the active brightness data for the first modulation frequency, determine a first two-dimensional (2D) active brightness image, and, based at least on the active brightness data for the second modulation frequency, determine a second 2D active brightness image. The instructions are further executable to determine a 2D translation based at least upon a comparison between the first 2D active brightness image and the second 2D active brightness image, determine corrected phase data based on the 2D translation to form corrected phase data, perform phase unwrapping on the corrected phase data to obtain a three-dimensional (3D) depth image, and output the 3D depth image.

DETAILED DESCRIPTION

Figure 1A:
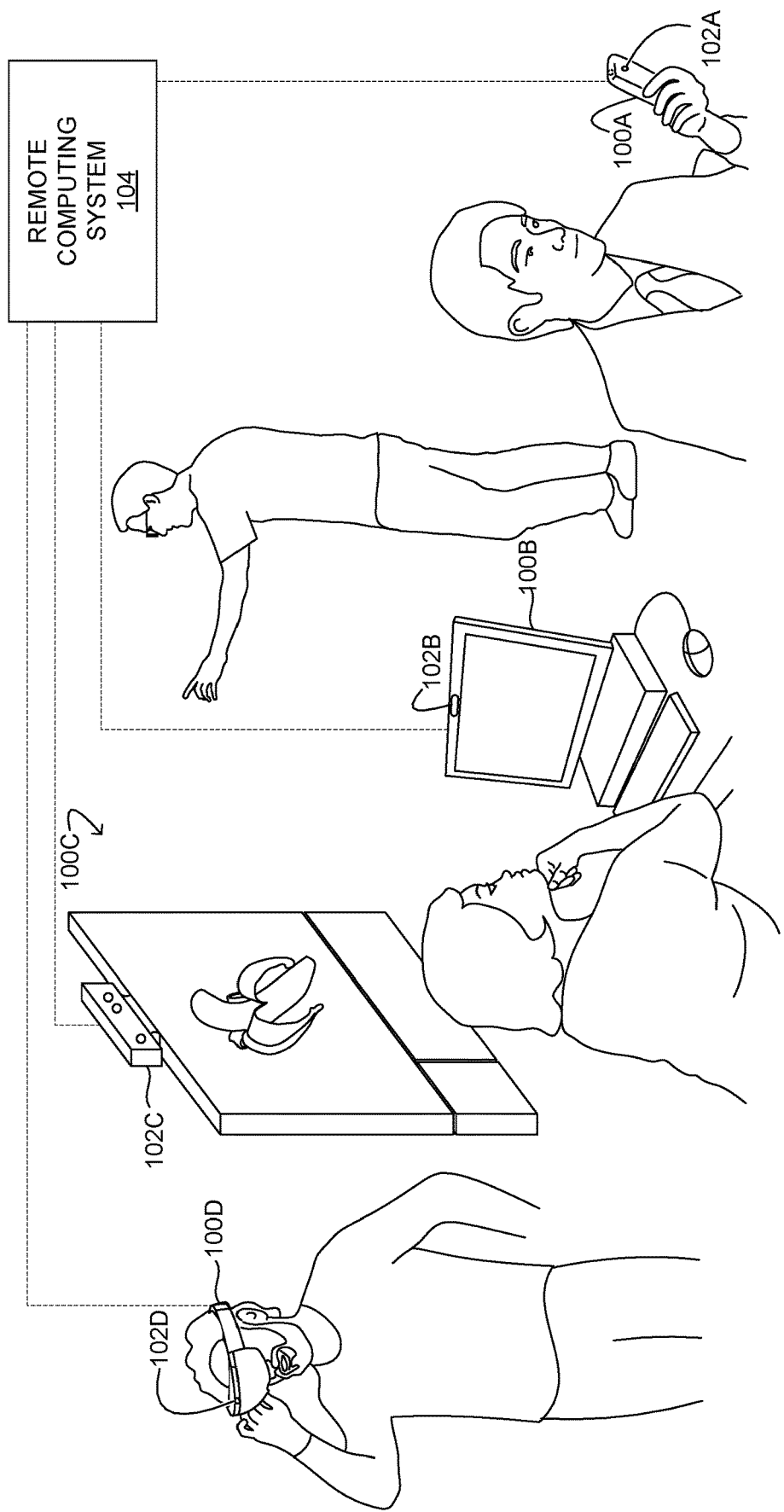
FIGS. 1A-1B show example electronic devices comprising time-of-flight (ToF) cameras.

As mentioned above, time-of-flight (ToF) depth cameras measure, for each sensor pixel of a depth image sensor, a length of a time interval for light emitted by the depth camera to return back to the sensor pixel. Phase-based ToF imaging is a variant of ToF imaging in which depth is computed based on the phase shift of amplitude modulated light reflected back from a subject. In phase-based ToF imaging, a light source on the ToF camera illuminates a scene with amplitude modulated light. The phase shift in the light reflected back from the subject is proportional to the subject's distance modulo the wavelength of the modulation frequency. However, due to the periodic nature of the modulated light, the measured total phase repeats (or wraps) every $2\pi$. Since the number of wrappings cannot be directly measured via a phase based ToF pixel, the total phase, and thus the actual distance related to the measurement, is ambiguous.

To address the issue of phase ambiguity, two or more different modulation frequencies can be used to increase the range of unambiguity, allowing the phase information to be "unwrapped" for the accurate determination of distance. Phase unwrapping is a way to disambiguate the phase data by illuminating the scene with amplitude-modulated light of a plurality of different frequencies, as the distance ambiguities are different for each frequency of illumination light. The ToF image data acquired by a ToF camera, also referred to as depth image data, comprises phase data for two or more modulation frequencies. As described in more detail below, each depth image frame comprises two or more intraframe phase data acquisitions corresponding to the two or more modulation frequencies.

Accurate phase unwrapping may be challenging when the ToF depth camera is in motion relative to the scene. For example, a user wearing a head-mounted display device (TIMID) comprising a ToF depth camera may move through an environment. However, the intraframe phase data acquisitions are temporally separated. Thus, due to the motion of the ToF camera between the phase data acquisitions, the intraframe phase data may be shifted relative to each other. For example, in the first intraframe phase data acquisition, a pixel may sense phase data at a first modulation frequency for a location within the scene. Then, during the next intraframe phase data acquisition, the pixel may sense phase data at the second modulation frequency for different scene location. The phase data for the different frequencies becomes misaligned, sometimes referred to as motion blur. Processing phase data affected by motion blur may be challenging, as the misaligned phase data may lead to unwrapping errors and unsatisfactory depth images.

Accordingly, examples are disclosed related to performing motion blur corrections on 3-dimensional (3D) depth image data. In such examples, phase data is corrected for motion blur prior to phase unwrapping. To do so, an active brightness (AB) image corresponding to a first illumination light modulation frequency is compared to an AB image for a second illumination light modulation frequency to determine an intraframe 2-dimensional (2D) translation. The intraframe 2D translation corresponds to estimated movement of the camera relative to the imaged scene. Then, the intraframe 2D translation is applied to the phase data to help align the phase images and form corrected phase data. Then, phase unwrapping is performed on the corrected phase data to obtain an intraframe-corrected 3D depth image. The intraframe 2D translation can also be used to perform a motion correction on the intraframe AB images. An intraframe-corrected AB image may be obtained, for example, via averaging the corrected AB images.

Examples are also disclosed that relate to interframe motion correction. In such examples, a first AB image from a first frame is compared to a second AB image from a second frame to determine an interframe 2D translation. The interframe translation is an estimate of the motion from frame to frame. Then, the interframe 2D translation can be applied to a depth image from the first frame to form an interframe-generated depth image. The interframe 2D translation may be determined based upon intraframe-corrected AB images. Additionally, as an estimation of camera motion, the interframe 2D translation may also be output and used in various temporal post-processing routines or software services. As such, the disclosed examples may help achieve motion blur corrections for 3D depth data using 2D intraframe AB image data. By using 2D data, the motion corrections may be performed in real time with relatively efficient computational performance compared to using 3D depth data for motion blur corrections.

Figure 1B:
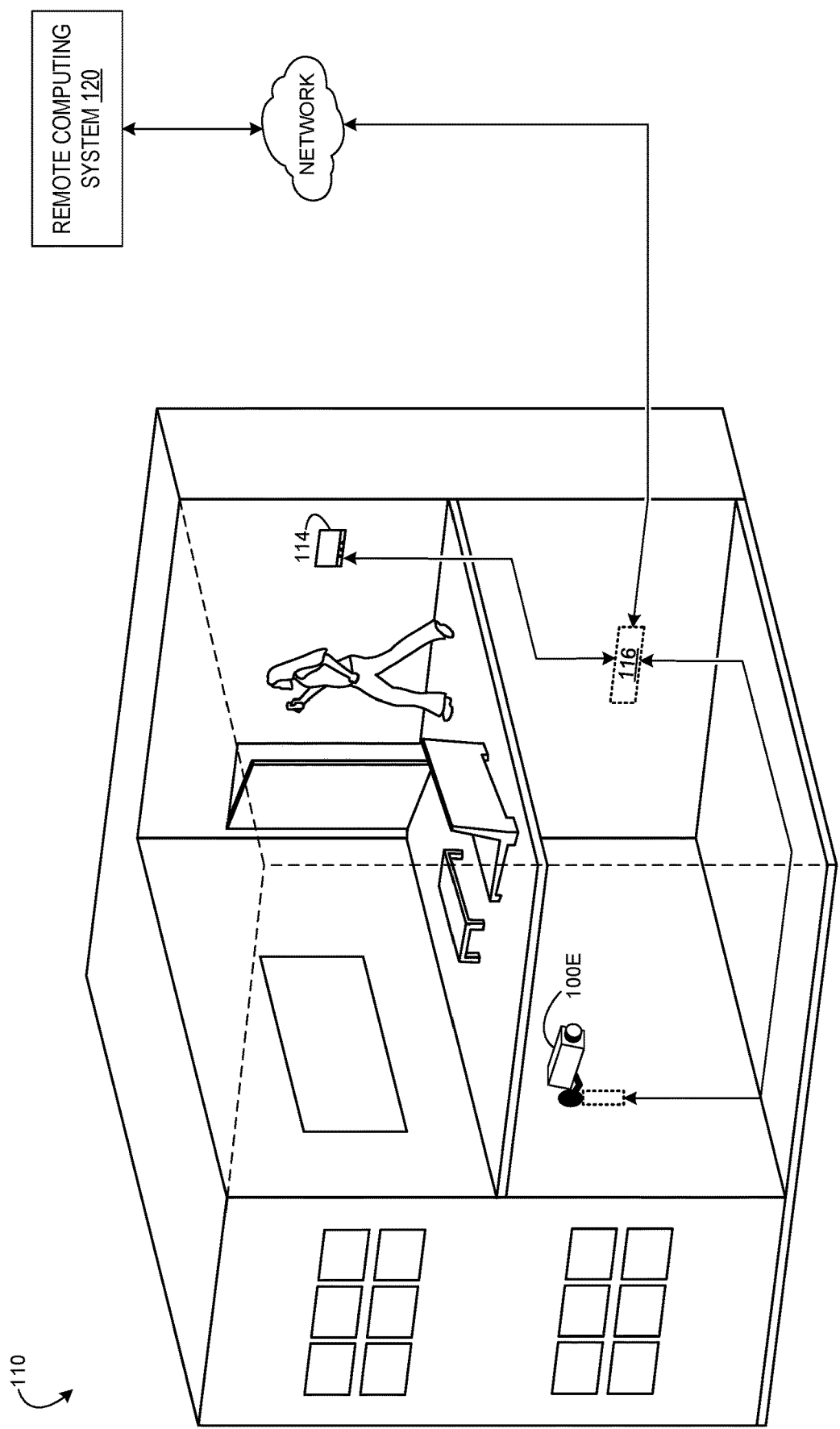

Prior to discussing these examples in detail, FIGS. 1A-1B illustrate various different example electronic devices 100A-E that may employ phase-based ToF depth cameras. Referring first to FIG. 1A, device 100A is a smartphone that includes a ToF camera 102A. Device 100B is a personal computer that includes a ToF web camera 102B. Device 100C is a video game system that includes a peripheral camera system comprising a ToF camera 102C. Device 100D is a virtual-reality headset that includes a camera system comprising a ToF camera 102D. Each device may communicate with a remote computing system 104 to implement a distributed depth pipeline. In combination with remote computing system 104, electronic devices 100A-D may process depth image data utilizing a distributed depth engine pipeline in some examples. Remote computing system 104 may comprise any suitable computing system, such as a cloud computing system, a PC, a laptop, a phone, a tablet, etc. In other examples, depth data may be processed locally on the ToF depth camera.

FIG. 1B shows an example use environment 110 including a security camera 100E comprising a ToF camera. Security camera 100E sends data to a remote computing system 120 via a communication hub 116. Remote computing system 120 may comprise any suitable computing system, e.g., an internet-of-things (IoT) endpoint device, a cloud computing system, an enterprise system, a networked PC, or a virtual machine implemented on a cloud computing system. Communication hub 116 also connects to other IoT devices, such as a thermostat 114. As mentioned above with regard to FIG. 1A, in combination with communication hub 116 and/or remote computing system 120, security camera 100E may process depth image data within a distributed depth engine pipeline. In other examples, a depth engine processing pipeline may be implemented on a single device.

Figure 2:
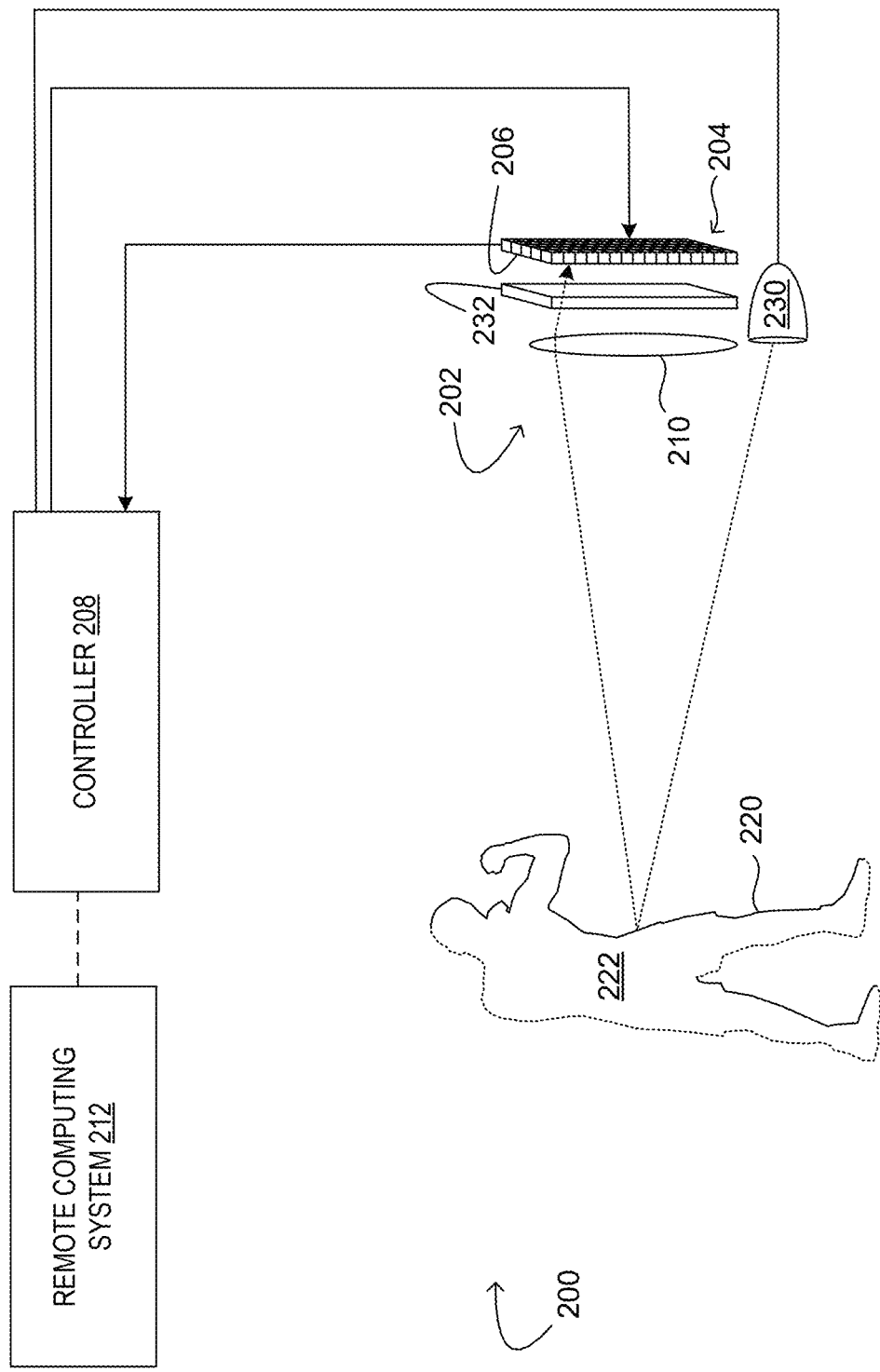
FIG. 2 shows aspects of an example ToF camera system.

FIG. 2 shows a schematic depiction of an example phase-based ToF depth imaging system 200 including a ToF camera 202. ToF camera 202 includes a sensor array 204 comprising a plurality of ToF pixels 206 each configured to acquire light samples that capture phase data, a controller 208, and an objective lens system 210. In some examples, objective lens system 210 may be omitted. Objective lens system 210 is configured to focus an image of at least one surface 220 of a subject 222 onto sensor array 204. Controller 208 is configured to gather and process data from ToF pixels 206 of sensor array 204 and thereby construct a depth image. Controller 208 may comprise executable instructions (e.g., software, firmware and/or hardware) to perform denoising and/or phase unwrapping, as described below. Controller 208 may be implemented across one or more computing devices. Controller 208 may communicate with a remote computing system 212 to perform depth image processing, for example, within a distributed depth image processing pipeline. Examples of hardware implementations of computing devices configured to perform phase unwrapping are described in more detail below with reference to FIG. 10.

Depth imaging system 200 also includes a modulated light emitter 230, and an analog and/or digitally modulated electronic shutter 232 for sensor array 204 to control the integration of light by the sensor array 204. Modulated light emitter 230 and sensor array 204 may be controlled via controller 208. Modulated light emitter 230 may be configured to emit electromagnetic radiation having any frequency detectable by ToF pixels 206. For example, modulated light emitter 230 may include an infrared (IR) light-emitting diode (LED), laser diode (LD), or any other suitable light source. The amplitude modulated light may be modulated at different frequencies sequentially or simultaneously, e.g., the modulation waveform may comprise a manifold of frequencies.

Sensor array 204 is configured to sample light from modulated light emitter 230 as reflected off surface 220 and back to the camera. Each ToF sensing pixel 206 of sensor array 204 may comprise one or more pixel taps operable to integrate the reflected light signal at different time intervals, from which the phase shift can be determined. Sensor array 204 is controlled, for each modulation frequency, to sample light at plural phase angles of the amplitude-modulated light from the light source, and determine a phase sample for each modulation frequency from the plurality of light samples for the modulation frequency. The phase samples can then be unwrapped to obtain a depth value for each pixel.

As mentioned above, due to the periodic nature of the modulated light, the measured total phase repeats (or wraps) every $2\pi$. For example, given a measured phase $\tilde{\phi}(k)$, the total phase is $\tilde{\phi}(k)+2\pi n(k)$, where $n(k)$, is an integer. Since $n(k)$, cannot be directly measured via a phase based ToF pixel, the total phase, and thus the actual distance related to the measurement, is ambiguous. Thus, in phase-based ToF imaging, there is a limitation on the distance that can be measured (referred to as the unambiguity range) imposed by the modulation frequency. As mentioned above, two or more different modulation frequencies can be used to increase the unambiguity range, and the collected phase shift data is then unwrapped for the accurate determination of distance.

Figure 3:
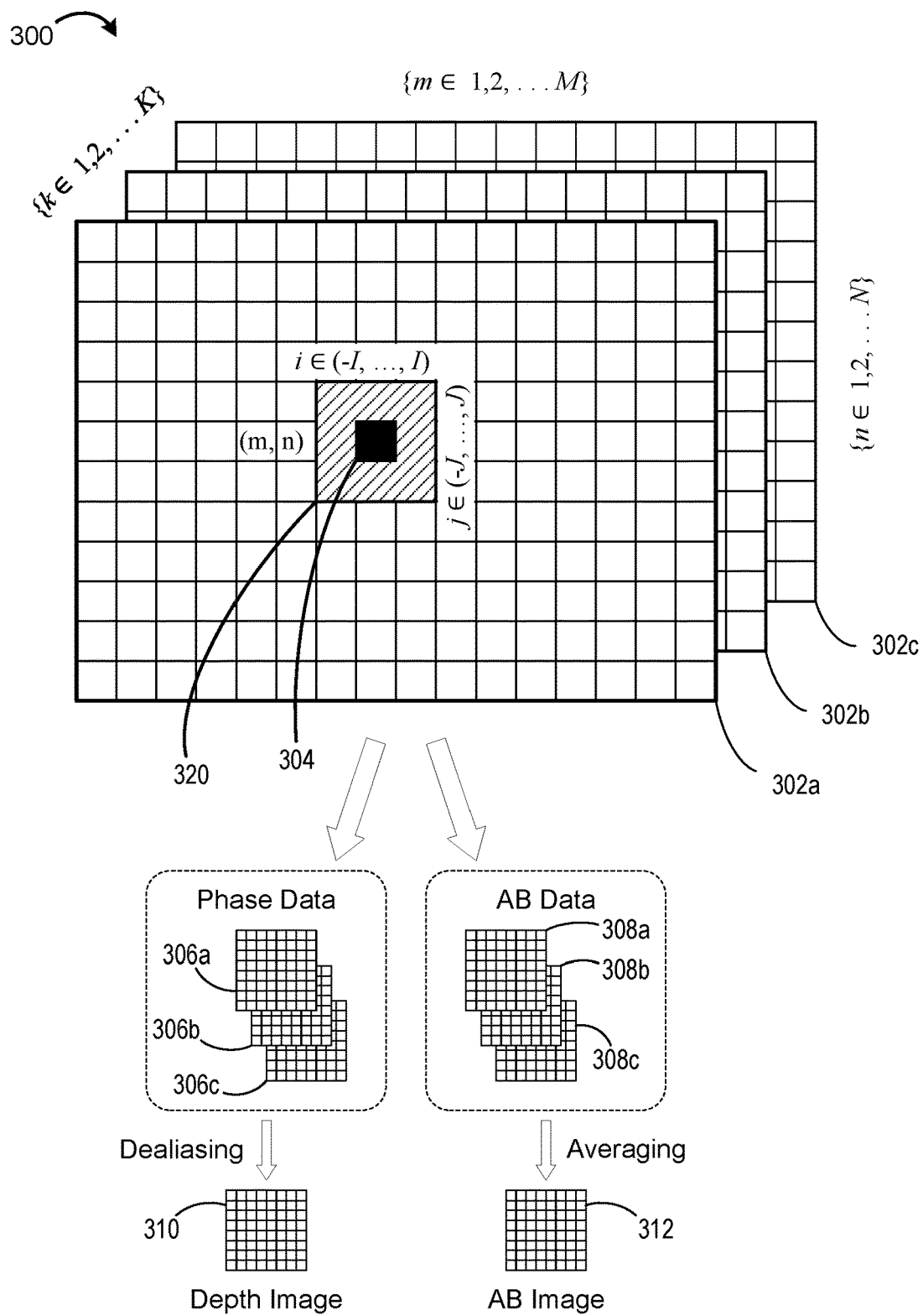
FIG. 3 schematically illustrates example ToF image data for a plurality K of modulation frequencies.

FIG. 3 schematically illustrates example ToF image data 300 for a plurality K of modulation frequencies. Data 300 represents data that can be acquired by depth imaging system 200 during multi-frequency frame collection. In the example shown, the depth data comprises a M×N array of data for each of K modulation frequencies, resulting in M×N grids of intraframe depth data 302a-c, wherein each pixel 304 in each grid represents a measurement acquired at a corresponding illumination light modulation frequency k of K modulation frequencies. For example, the experimental signal $\tilde{S}$ collected by pixel 304 at (m, n), for the modulation frequency k is represented by $$\tilde{S}(m, n, k) = \widetilde{AB}(m, n, k)e^{i\ddot{\phi}(m,n,k)}$$

where $\widetilde{AB}$ is the active brightness, $\ddot{\phi}(k)$ is the phase, {m∈ 1, 2 . . . , M}, {n∈ 1, 2 . . . , N}, and {k∈ 1, 2 . . . , K}. A tilde accent over a variable indicates that the variable is obtained and/or calculated experimentally, while the absence of a tilde accent indicates variables that correspond to a noise-free situation. While the example depicted in FIG. 3 shows three grids of intraframe depth data 302a-c, any number of frequencies K≥2 can be used.

The phase of the complex signal $\ddot{\phi}(k)$ may be computed as $$\ddot{\phi}(k) = \arctan 2(\tilde{S}_i(k), \tilde{S}_r(k))$$

where $\tilde{S}_i(k)$ is the imaginary part of the signal collected for frequency k and $\tilde{S}_r(k)$ is the real part of the signal collected. The measured phase is used to compute the depth value associated with the pixel. However, as mentioned above, in phase-based ToF imaging, there is a limitation on the distance that can be measured (referred to as the unambiguity range) imposed by the modulation frequency. Accordingly, a set of K≥2 modulation frequencies k can be used to increase the range of unambiguity, allowing the phase information to be unwrapped for the accurate determination of distance. Phase unwrapping is a way to disambiguate the phase shift data and identify a correct distance value by illuminating the scene with amplitude-modulated light of a plurality of different frequencies, as the distance ambiguities are different for each frequency of illumination light. For example, in a multifrequency method, the amplitude modulated light may comprise a waveform comprising a plurality of frequencies $\vec{f} = \{f_1, f_2, \ldots, f_K\}$. The collection of frequencies comprises frequencies that are chosen to wrap at different locations in the unambiguity range, which extends from distance zero to a point where all three frequencies wrap at a common distance.

The phase and AB per frequency can be estimated using a Discrete Fourier Transform (DFT) projection. In one example, three acquisitions are made with phase-locked phases separated by 120 degrees. Such acquisitions may help increase the signal to noise ratio by canceling part of the harmonics. The DFT projection may be calculated using $$\begin{cases} S_r(k) = \sum_{c=0}^{2} s(c, k) \cdot \cos(\varphi + 120 \cdot c) \\ S_i(k) = \sum_{c=0}^{2} s(c, k) \cdot \sin(\varphi + 120 \cdot c) \end{cases}$$

where k is the frequency, φ is the acquisition phase, $S_r$ is the real part of the signal, and $S_i$ is the imaginary part of the signal, and s(c, k) is the signal collected by the pixel per capture c. Then, two observables (phase and active brightness) are calculated using $$\begin{cases} \phi(k) = \arctan 2(S_i(k), S_r(k)) \\ AB(k) = \|S_r(k) + i S_i(k)\| \end{cases}$$

where φ is the phase and AB is the average active brightness. As such, acquisitions made by the ToF depth image sensor (e.g., intraframe depth data 302a-c) are used to form a grid of phase data (phase image) and a grid of AB data (AB image) for each modulation frequency. For example, as shown in FIG. 3, intraframe depth data 302a is processed to form intraframe phase image 306a and intraframe AB image 308a. Likewise, intraframe depth data 302b-c are processed to yield intraframe phase images 306b-c and intraframe AB images 308b-c, respectively. Then, de-aliasing (phase unwrapping) is performed on the intraframe phase images 306a-c to form a depth image 310. Further, AB averaging can be performed on the intraframe AB images 308a-c to form an AB image 312.

However, as discussed above, phase unwrapping errors may occur if the ToF depth camera is in motion. As the acquisition of depth data occurs sequentially for each frequency, the phase images and AB images are temporally separated within a frame. For example, intraframe phase image 306a may comprise first frequency $f_1$ phase data acquired towards the beginning of the frame, intraframe phase image 306b may comprise second frequency $f_2$ phase data acquired during the middle of the frame, and intraframe phase image 306b may comprise third frequency $f_3$ phase data acquired towards the end of the frame. Thus, if the ToF depth camera moves between intraframe acquisitions, phase data for the three different frequencies may be shifted and misaligned. As discussed above, misaligned phase data may lead to errors in phase unwrapping.

Figure 4:
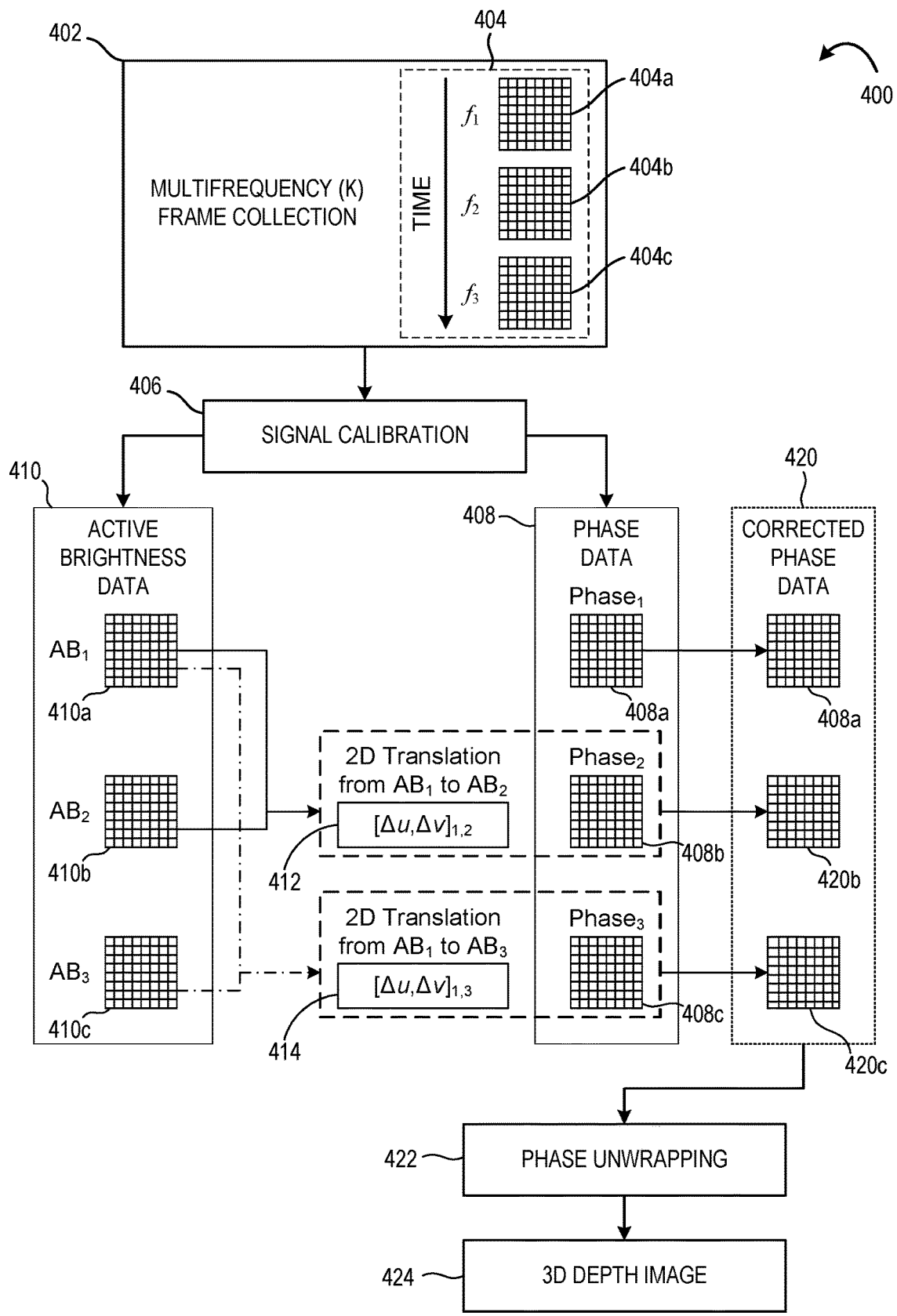
FIG. 4 shows an example method for performing intraframe motion blur correction on ToF image data.

Accordingly, examples are disclosed that utilize AB image data to estimate motion and determine a 2D translation. While depth data also can be used, determining the 2D translation based on AB image data may be more robust due to active brightness differences between objects in a scene. The 2D translation is then used to perform an intraframe motion correction on the phase data. Performing phase unwrapping on the intraframe-corrected phase data may help avoid unwrapping errors due to motion blur. FIG. 4 shows an example method for performing such a correction on depth data prior to phase unwrapping. Method 400 may be implemented on a computing system that receives data from a ToF depth camera. In some examples, method 400 may be implemented on a computing device incorporating the depth camera.

Method 400 comprises multifrequency frame collection at 402, where a plurality of intraframe phase samples (each comprising a portion of a frame of depth data 404) is collected via a ToF image sensor. An intraframe phase sample is collected for each of a plurality of illumination light modulation frequencies ($f_1, f_2, f_3$) to form corresponding intraframe depth data 404a-c. In this example, intraframe depth data 404a is acquired first, intraframe depth data 404b is acquired second, and intraframe depth data 404c is acquired third, as indicated by the time arrow. At 406, signal calibration correction is performed to obtain phase data 408 and active brightness data 410. While the examples in FIGS. 4 and 6 use three modulation frequencies, in other examples, any suitable number of modulation frequencies may be used.

As discussed above, intraframe depth data for different frequencies may be shifted relative to each other due to camera motion. Thus, method 400 compares active brightness data 410 to estimate and correct for the motion. Here, intraframe AB image 410a is compared to intraframe AB image 410b to determine a first intraframe 2D translation 412. Here, the 2D translation from $AB_1$ to $AB_2$ may be represented by $[\Delta u, \Delta v]_{1,2}$ where $\Delta u$ is the pixel shift in the x-direction and $\Delta v$ is the pixel shift in the y-direction. Intraframe 2D translation 412 is an estimate of the motion between the acquisition of intraframe depth data 404a and intraframe depth data 404b. Next, intraframe AB image 410a is compared to intraframe AB image 410c to determine a second intraframe 2D translation 414, represented as $[\Delta u, \Delta v]_{1,3}$. In some examples, intraframe AB image 410b may be compared to intraframe AB image 410c to determine a third intraframe 2D translation. In other examples, any suitable pair of intraframe AB images may be compared to determine a corresponding intraframe 2D translation. Any suitable method may be used to compare AB images and determine a translation. In some examples, features are extracted from AB images to form feature maps which are used to compare the images. Example methods for feature extraction and calculation of a 2D translation are discussed below with regards to FIG. 7.

After determining the 2D translations, the translations determined can be used to correct the phase data. In the example depicted in FIG. 4, intraframe 2D translation 412 is applied to phase image 408b to correct the phase image and form a corrected phase image 420b. Likewise, intraframe 2D translation 414 is applied to phase image 408c to correct the phase image and form a corrected phase image 420c. A 2D translation $[\Delta u, \Delta v]$ may be applied to an image AB, for example, using $AB'_{i,j}=AB_{i+\Delta u,j+\Delta v}$ to obtain a corrected image AB'. Phase image 408a may be used for corrected phase data 420. As such, corrected phase data 420 represents phase data that have been "realigned" to phase image 408a. Without loss of generality, in some examples, one or more 2D translations may be applied to form corrected phase images that are aligned with phase image 408b or 408c.

At 422, method 400 further comprises performing phase unwrapping on corrected phase data 420 to form a depth image 424. As corrected phase images 420b, 420c may be realigned with phase image 408a, phase unwrapping at 422 may produce relatively fewer unwrapping errors compared to examples that omit motion blur corrections. As such, method 400 may help achieve better performance in processing depth data 404 to form depth image 424. Additionally, application of the intraframe 2D translation may be performed via convolutions, and therefore may be combined with spatial and temporal filtering processes which also utilize convolutions. Further, as an estimate of camera motion, the determined intraframe 2D translation may help enable various post-processing applications, such as temporal filters, trajectory estimation, dynamic region estimation, or mapping.

Figure 5:
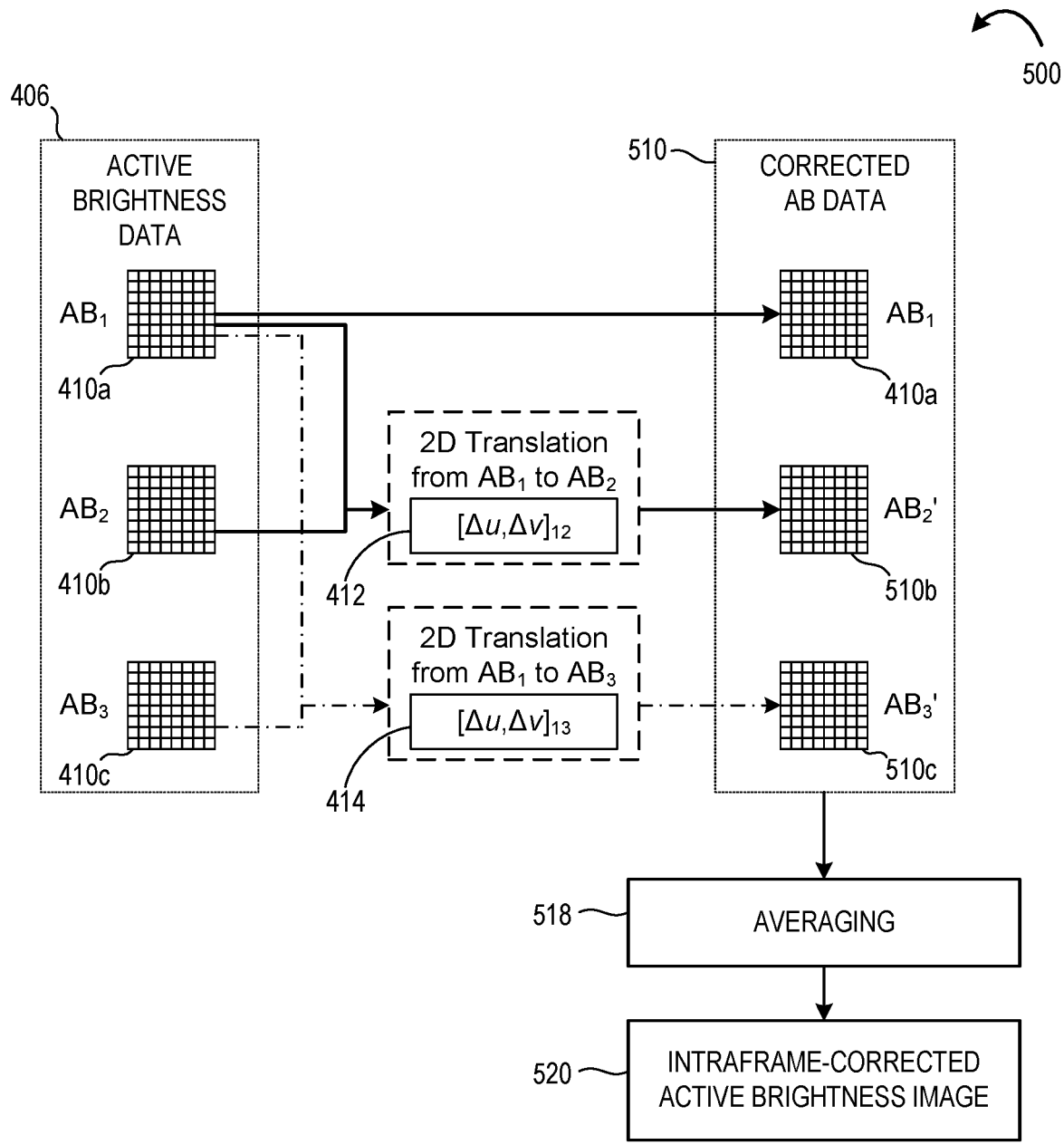
FIG. 5 shows an example method for performing an intraframe correction on active brightness data.

A similar technique can be used to correct intraframe AB images and form an intraframe-corrected AB image. Referring to FIG. 5, method 500 utilizes the intraframe 2D translations 412, 414 to form corrected AB data 510. In some examples, method 500 is performed together with method 400. In other examples, method 500 is performed separately from method 400. As shown in FIG. 5, intraframe 2D translation 412 is applied to intraframe AB image 410b to correct the image and form a corrected AB image 510b. Further, intraframe 2D translation 414 is applied to AB image 410c to form a corrected AB image 510c. Together with intraframe AB image 408a, corrected AB images 510b-c form corrected AB data 510.

At 518, method 500 further comprises averaging corrected AB data 510 to form an intraframe-corrected AB image 520. Intraframe-corrected AB image 520 may be output for further processing and/or output to a display. As described below, intraframe-corrected AB images may also be used for generating interframe depth images.

Figure 6:
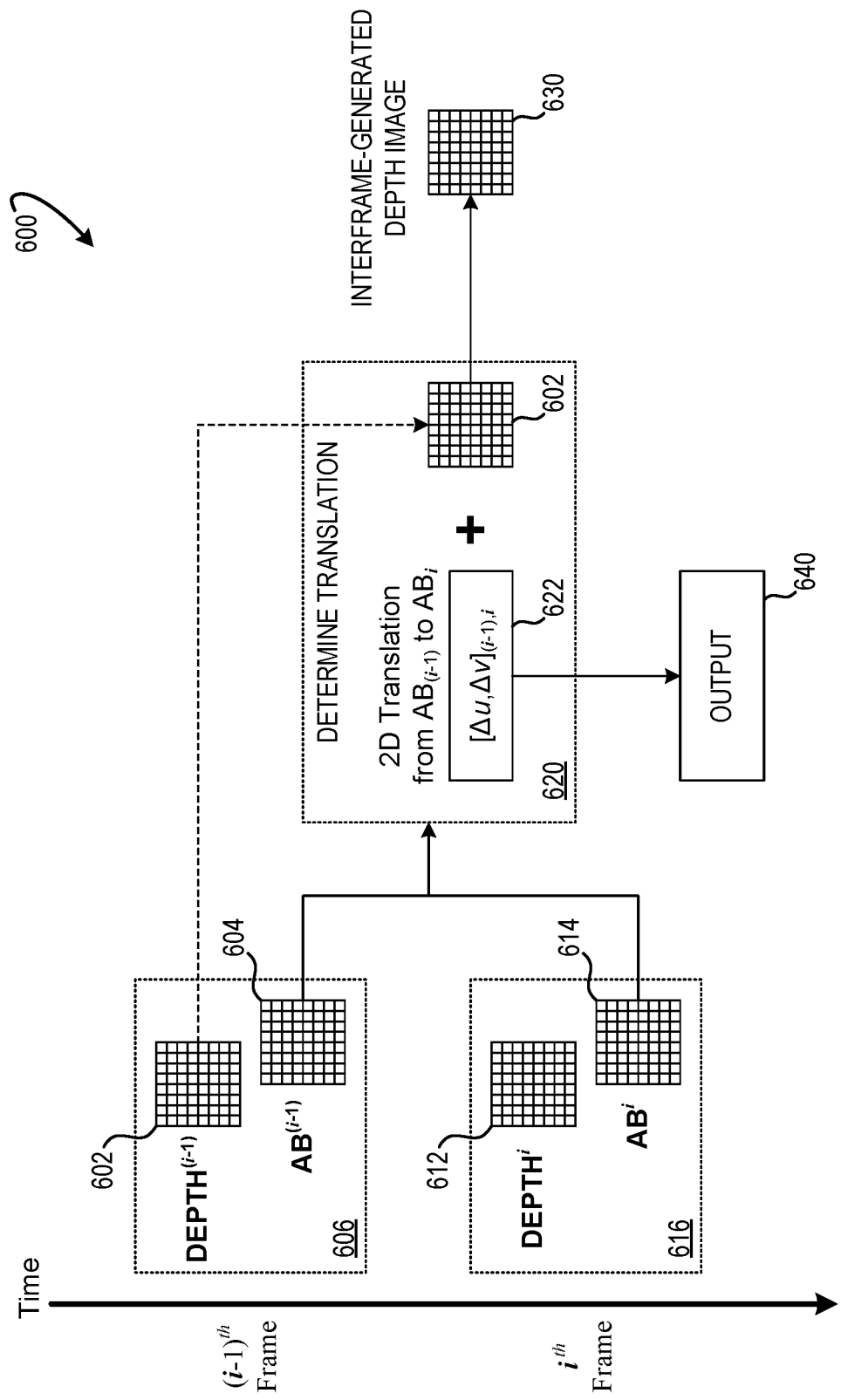
FIG. 6 shows an example method for determining an interframe translation between image frames and forming an interframe-generated depth image.

In addition to correcting motion blur within a depth image frame, corrections can also be performed between frames. FIG. 6 shows an example method 600 for motion blur corrections by determining an interframe 2D translation which can be used to generate an interframe depth image. Method 600 receives input of a first depth image 602 and a first AB image 604 corresponding to an $(i-1)^{th}$ image frame 606. Method 600 further received input of a second depth image 612 and a second AB image 614 corresponding to an $i^{th}$ image frame 616.

In some examples, interframe corrections may be performed while omitting intraframe corrections, which may be suitable when camera motion is relatively slower. However, when camera motion is relatively faster, interframe corrections may be combined with intraframe corrections for more robust blur correction. As such, method 600 may utilize intraframe-corrected images as input. For example, depth images 602, 612 each comprise an intraframe-corrected depth image (e.g., formed via method 400). Further, in some examples, AB images 604, 614 each comprise an intraframe corrected AB image (e.g., formed via method 500). In other examples, any other suitable depth image and any suitable AB image may be used as input.

Continuing, method 600 further comprises, at 620, determining an interframe 2D translation 622 based upon first AB image 604 and second AB image 614. Interframe 2D translation 622 is an estimate of the motion between frame i−1 and frame i represented as $[\Delta u, \Delta v]_{(i-1),i}$ where $\Delta u$ is the pixel shift in the x-direction and $\Delta v$ is the pixel shift in the y-direction. In some examples, determining the interframe 2D translation at 620 may comprise feature extraction. Examples for extracting features and determining the translation are described in more detail below with regards to FIG. 7.

After determining the 2D translation, the translation can be applied to a depth image to generate an interframe depth image. As shown in FIG. 6, interframe 2D translation 622 is applied to first depth image 602 to form an interframe-generated depth image 630. Additionally or alternatively, the interframe 2D translation may be applied to second depth image in some examples. In some examples, interframe-generated depth image 630 may comprise an approximate interpolation between frame i−1 and frame i. For example, interframe 2D translation 622 may be multiplied by a scalar, such as 0.5, and applied to the first depth image to generate an interframe-generated depth image that is halfway between frame i−1 and frame i. In some examples, a plurality of interframe-generated depth image may be generated. For example, scalars of ⅓ and ⅔ may be used to generate two interframe-generated depth images between frame i−1 and frame i. In other examples, any suitable number of interframe-generated depth image may be formed.

In addition to generating interframe depth images, the estimated interframe motion may be utilized for additional depth data processing. For example, at 640, interframe 2D translation 622 may assist with a temporal post-processing process to compensate motion blur generated by temporal processing, or other software service. Example post-processing processes and applications include temporal filters, trajectory estimation, dynamic region estimation, and mapping. In some examples, interframe 2D translation 622 is output together with interframe-generated depth image 630. In some examples, interframe 2D translation 622 may be stored and/or used in a motion model.

As discussed above, various methods may be utilized to compare AB images to determine a translation. For example, Normal Distribution Transform (NDT) matching may be used. However, while NDT matching can be applied to 3D data, current NDT matching algorithms are not designed to handle 2D data. As such, a variant of NDT is disclosed herein for comparing 2D AB images, referred to as Image Space-based NDT (IS-NDT) matching. IS-NDT matching may convert the 6-degrees of freedom (DOF) scan-matching problem into a 2-DOF translation problem. IS-NDT is a grid-based approach and may help provide efficient computation when applied to 2D data from ToF image sensors.

Figure 7:
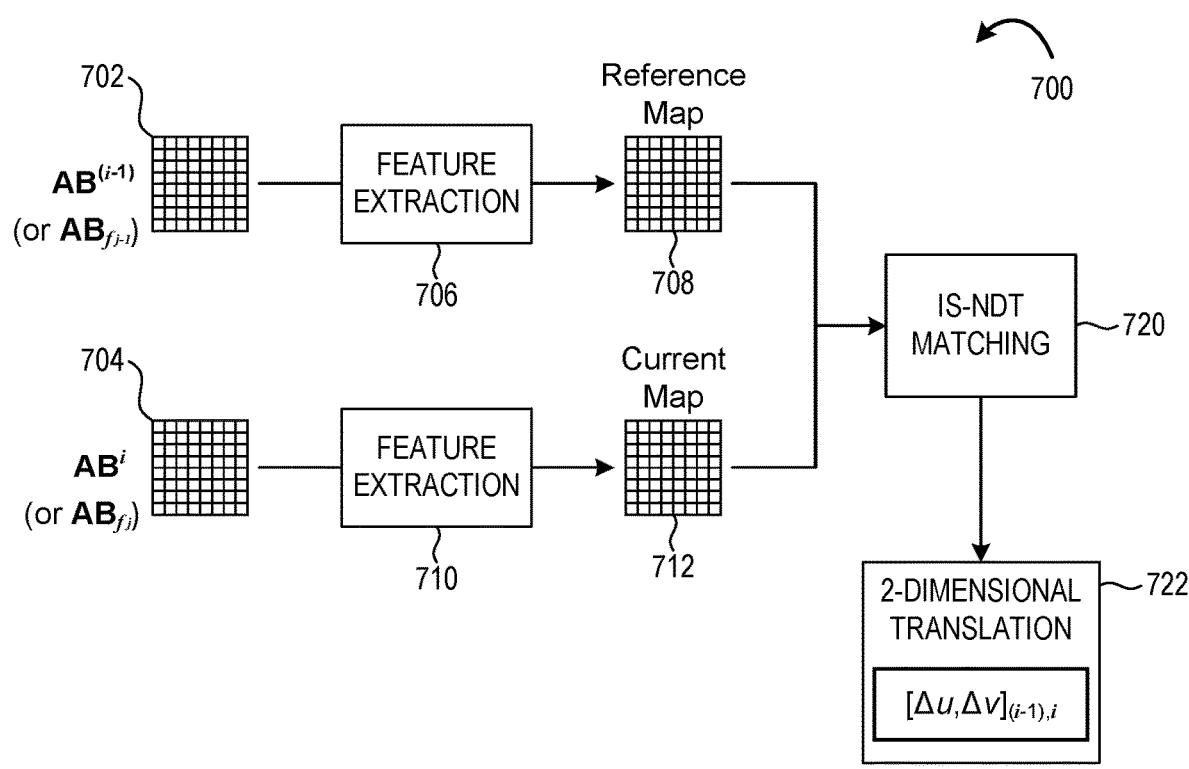
FIG. 7 shows an example method for determining a 2-dimensional translation between two active brightness images.

FIG. 7 shows an example method 700 that utilizes an IS-NDT matching approach for determining a 2D translation between a first AB image 702 and a second AB image 704. Method 700 may be used to compare any suitable AB images. In some examples, first AB image 702 comprises an intraframe AB image for a frequency $f_{j-1}$, second AB image 704 comprises an intraframe AB image for the next modulation frequency $f_j$, and method 700 is used to determine an intraframe 2D translation. For example, method 700 may be used to determine intraframe 2D translation 412 or 414 based upon intraframe AB images 404a-c. Further, in some examples, first AB image 702 corresponds to a first frame (or $(i-1)^{th}$ frame), second AB image 704 corresponds to a second frame (or $i^{th}$ frame), and method 700 is used to determine an interframe 2D translation. For example, method 700 may be used at 620 to determine interframe translation 622 based upon first AB image 604 and second AB image 614.

At 706, feature extraction is performed on first AB image 702 to determine a reference feature map 708 corresponding to the $(i-1)^{th}$ frame. Likewise, at 710, feature extraction is performed on second AB image 704 to determine a current feature map 712 corresponding to the $i^{th}$ frame. Any suitable method may be used for feature extraction. In some examples, a sum of squared differences (SSD) is used to determine the feature maps. For example, at each pixel of AB grid data, a SSD can be calculated as a sum of squared differences with all pixels in a neighborhood surrounding the pixel. SSD may provide a useful metric for capturing geometric information in AB image data such as curvature and edges. In some examples, the SSD (ssd) can be calculated using:

$$ssd(X_{i,j}) = \sum_{\Delta i = i-\frac{k}{2}}^{i+\frac{k}{2}} \sum_{\Delta j = j-\frac{k}{2}}^{j+\frac{k}{2}} (X_{i+\Delta i, j+\Delta j} - X_{i,j})^2$$

where $X_{i,j}$ is the AB signal for pixel i,j, and the SSD is calculated over a square neighborhood region of size k. A pixel neighborhood may comprise any suitable size k surrounding the pixel, where k is an integer greater than zero. Returning briefly to FIG. 3, a SSD for pixel 304 may be calculated based upon pixels within neighborhood 320.

After computing the SSD, a threshold can be applied to identify features such as edge pixels. In some examples, a threshold may be applied using:

$$STD(\{ssd(X_{i,j}), i,j \in \{\max(i) - \min\{i\} \leq k, \max(j) - \min\{j\} \leq k\}\}) > \delta_{threshold}$$

where STD is the standard deviation of the SSD metric for pixels i,j within a neighborhood of size k, and $\delta_{threshold}$ is a selected threshold. A relatively greater threshold may result in relatively fewer number pixels considered as features. In some examples, a $\delta$ threshold between 0.5 and 1.5 may be used. In some examples, a $\delta$ threshold between 0.5 and 1.0 may be used. In other examples, any other suitable threshold may be used. In some examples, a threshold may be selected by a user. Furthermore, in some examples, the threshold may be adaptively assigned based on the scene environment, a number of feature pixels identified, and/or other factors.

In some examples a Sobel edge detection method may be used to form feature maps 708, 712. In further examples, a Canny edge detection method may be employed. In still further examples, any other suitable method may be used for feature extraction. In yet further examples, feature extraction can be omitted. However, providing feature maps to the matching algorithm may provide improved performance and/or computational efficiency compared to omitting feature maps.

Continuing, after forming reference feature map 708 and current feature map 712, the feature maps are input into an IS-NDT matching algorithm 720. As mentioned above, IS-NDT matching algorithm 720 finds a 2D translation that matches current feature map 712 to reference feature map 708. The IS-NDT algorithm calculates a matching score for a plurality of 2D translations and select a selected 2D translation 722 based on a highest matching score. Selected 2D translation 722 is output and used to correct phase data and/or AB data. For example, selected 2D translation 722 may be used as intraframe 2D translation 412, intraframe 2D translation 414, or interframe 2D translation 622.

The IS-NDT matching algorithm may utilize any suitable method to calculate a matching score. In some examples, a Gaussian distribution is approximated at each pixel whereby a local mean and local variance is computed for each pixel in the reference feature map (e.g., using a kernel size k). As such, a reference mean map and a reference variance map can be formed from reference feature map 708. Further, a current mean map can be formed for current feature map 712. Then, the matching score may be computed based on a probability of the Gaussian distribution in reference map pixels and the mean of corresponding pixels in the current mean map. In such examples, the matching score may then be calculated using:

$$f\left([\Delta u, \Delta v], M_{i,j}^{c'}, M_{i,j}^{R}, \sum_{i,j}^{R}\right) = \sum_{i=1}^{I}\sum_{j=1}^{J} N\left(M_{i,j}^{c'}, M_{i,j}^{R}, \sum_{i,j}^{R}\right)$$

where $M^R$ is the reference mean map, $\Sigma^R$ is the reference variance map, $M^{c'}$ is a translated current feature map, and N is a Gaussian distribution probability function. Here, $M^{c'}$ is a mean map after application of a 2D translation [$\Delta u$, $\Delta v$] to the current feature map $M^c$, and $f$ is the matching score for the translation. For example, the current mean map $M^c$ may be transformed using: $M_{i,j}^{c'} = M_{i+\Delta u, j+\Delta v}^{c}$.

The matching score may be computed over a 2D search space of potential translations [$\Delta u$, $\Delta v$]. In some examples, a steepest gradient method may be used to sample the 2D search space and select a highest matching score. In some examples, a global optimization method or simplex method may be used to determine the translation with the highest matching score. Furthermore, in some examples, the search space may be limited to a relatively small search space. For example, the matching score may be computed for a plurality of translations [Δu, Δv] subject to 0≤Δu, Δv≤P where P is any suitable number of pixels, such as 5, 10, 20 or other value.

In examples where the steepest gradient method is employed, the learning rate may be changed dynamically based on the iterations. For example, the 2D translation in the $k^{th}$ iteration may be determined using:

$$[\Delta u, \Delta v]_k = [\Delta u, \Delta v]_{k-1} - a k \cdot \nabla f([\Delta u, \Delta v], M^R, \Sigma^R, M^{c'})$$

where α is an adaptive learning rate. In some examples, the initial solution is [0,0]. In some examples, the initial solution may be based on a previously determined 2D translation. In some examples, the search directions for the gradient calculation may be initially constrained to the four cardinal directions, e.g., [1, 0], [0, 1], [−1, 0], and [0, −1]. Then, based on the search results, the search may proceed in intercardinal directions, e.g., [1, 1], [1, −1], [−1, 1], and [−1, −1]. For example, if the search directions [1,0] and [0,1] produce higher matching scores compared to [−1,0] and [0, −1], the sub-direction [1,1] may be searched next. This search method may provide a computationally efficient gradient search in 2D space and reduce computation time.

Figure 8A:
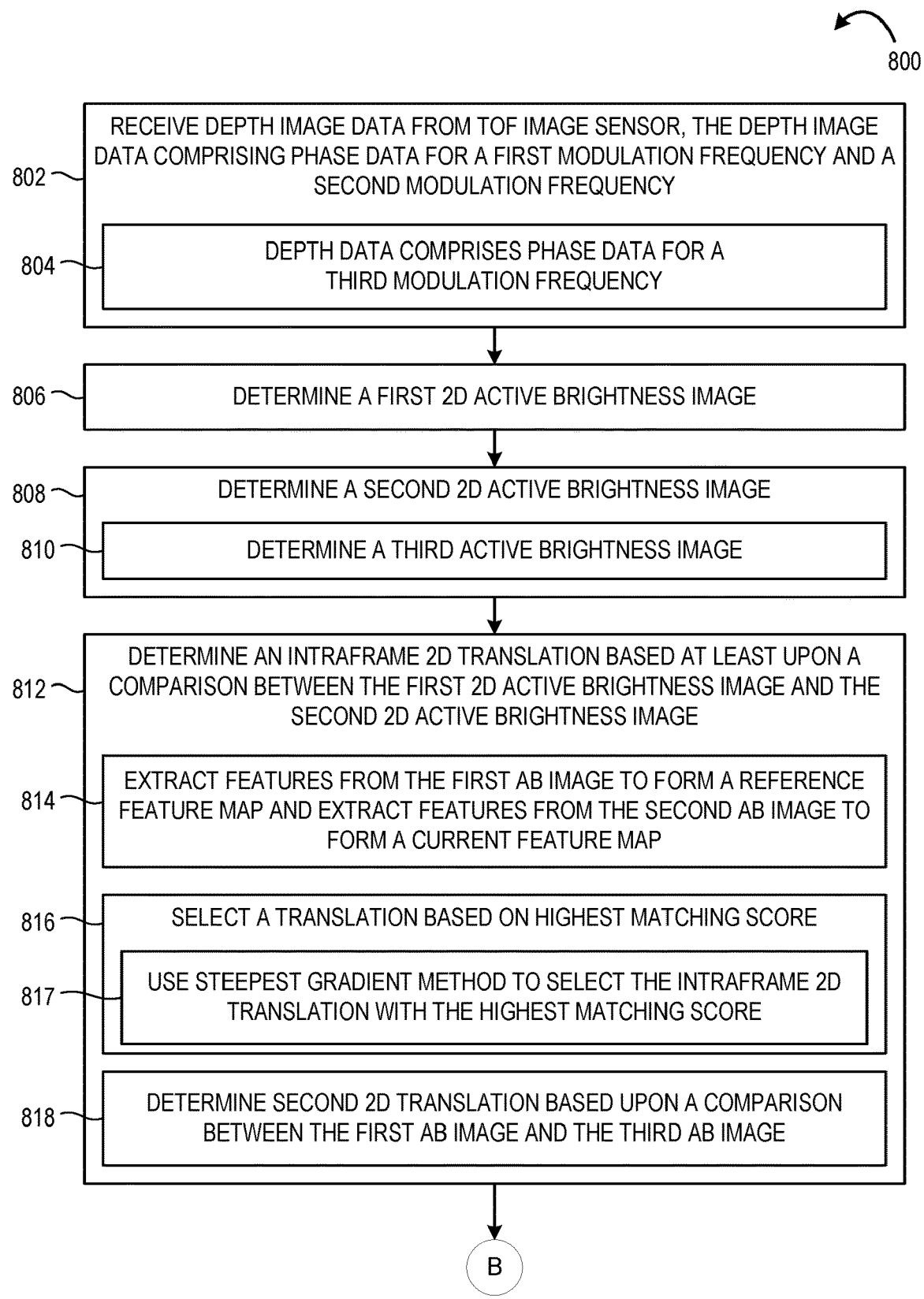
FIGS. 8A-8B show a flow diagram of an example method for performing intraframe corrections to form an intraframe-corrected depth image.
Figure 8B:
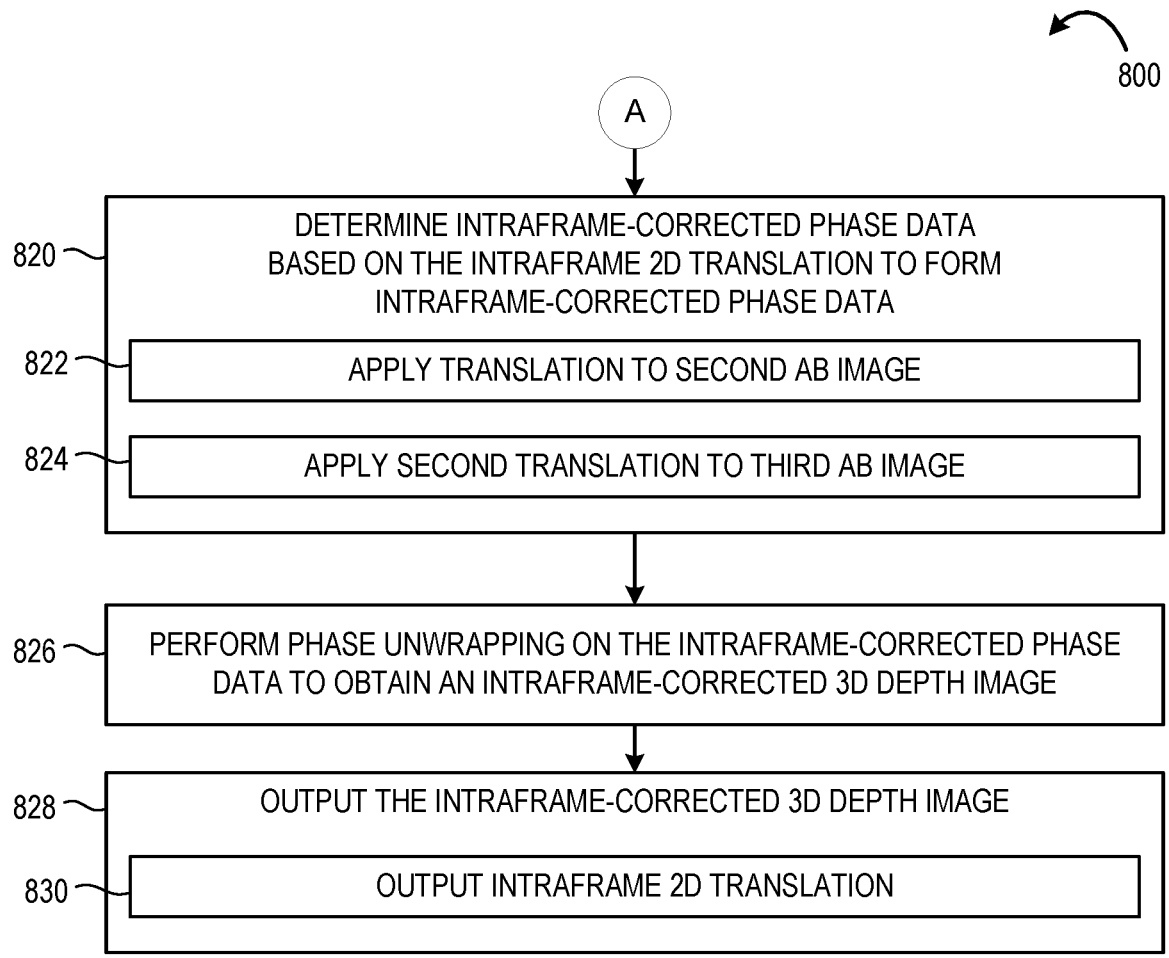

FIGS. 8A-8B show a flow diagram of an example method 800 for correcting motion blur in 3D depth data. Method 800 comprises, at 802, receiving depth image data for an image frame from a ToF image sensor, the depth image data comprising phase data for a first modulation frequency and a second modulation frequency, the depth image data further comprising active brightness data for the first modulation frequency and the second modulation frequency. In some examples, at 804, the depth data further comprises phase data and active brightness data for a third modulation frequency.

Continuing, at 806, the method comprises, based at least on the active brightness data for the first modulation frequency, determining a first two-dimensional (2D) active brightness image. At 808, method 800 further comprises, based at least on the AB data for the second modulation frequency, determining a second 2D AB image. In examples that include 804, the method may comprise, based at least on the AB data for the third modulation frequency, determining a third 2D active brightness image at 810.

Method 800 further comprises, at 812, determining an intraframe 2D translation based at least upon a comparison between the first 2D active brightness image and the second 2D active brightness image. In some examples, at 814, the method comprises extracting one or more features from the first 2D active brightness image to form a reference feature map and extracting one or more features from the second 2D active brightness image to form a current feature map. In some examples, feature extraction may be performed using Sobel edge detection, Canny edge detection, or a SSD threshold. In some examples, a feature map may be processed to determine a mean map and/or a variance map.

In some examples, at 816, determining the intraframe 2D translation comprises selecting a translation based on a matching score. In some examples, the matching score is calculated based on the reference feature map and the current feature map. In some examples, the matching score is calculated using:

$$f\left([\Delta u, \Delta v], M_{i,j}^{c'}, M_{i,j}^R, \sum_{i,j}^R\right) = \sum_{i=1}^{I}\sum_{j=1}^{J} N\left(M_{i,j}^{c'}, M_{i,j}^R, \sum_{i,j}^R\right)$$

where $M^R$ is the reference mean map, $\Sigma^R$ is the reference variance map, $M^{c'}$ is a translated current feature map translated by [Δu, Δv], N is a Gaussian distribution probability function, and $f$ is the matching score for the translation [Δu, Δv]. In some examples, at 817, the method comprises selecting a 2D translation having a highest matching score using a steepest gradient method.

In examples that include 804 and 810, method 800 may further comprise, at 818, determining a second intraframe 2D translation based upon a comparison between the first AB image and the third AB image. As such, the method may further comprise performing feature extraction on the third AB image. The method may also comprise selecting the second intraframe 2D translation by selecting a translation with a highest matching score as described above. In other examples, an interframe 2D translation may be determined between the second AB image and the third AB image.

Continuing to FIG. 8B, at 820, method 800 further comprises determining intraframe-corrected phase data based on the intraframe 2D translation to form intraframe-corrected phase data. In some examples, at 822, the intraframe 2D translation is applied to the second AB image. In examples that include 818, the method may comprise applying the second intraframe 2D translation to the third AB image at 824.

At 826, the method further comprises performing phase unwrapping on the intraframe-corrected phase data to obtain an intraframe-corrected three-dimensional (3D) depth image for the image frame. At 828, the method comprises outputting the intraframe-corrected 3D depth image for the image frame. In some examples, at 830, the method comprises outputting the intraframe 2D translation with the intraframe-corrected 3D depth image.

Figure 9:
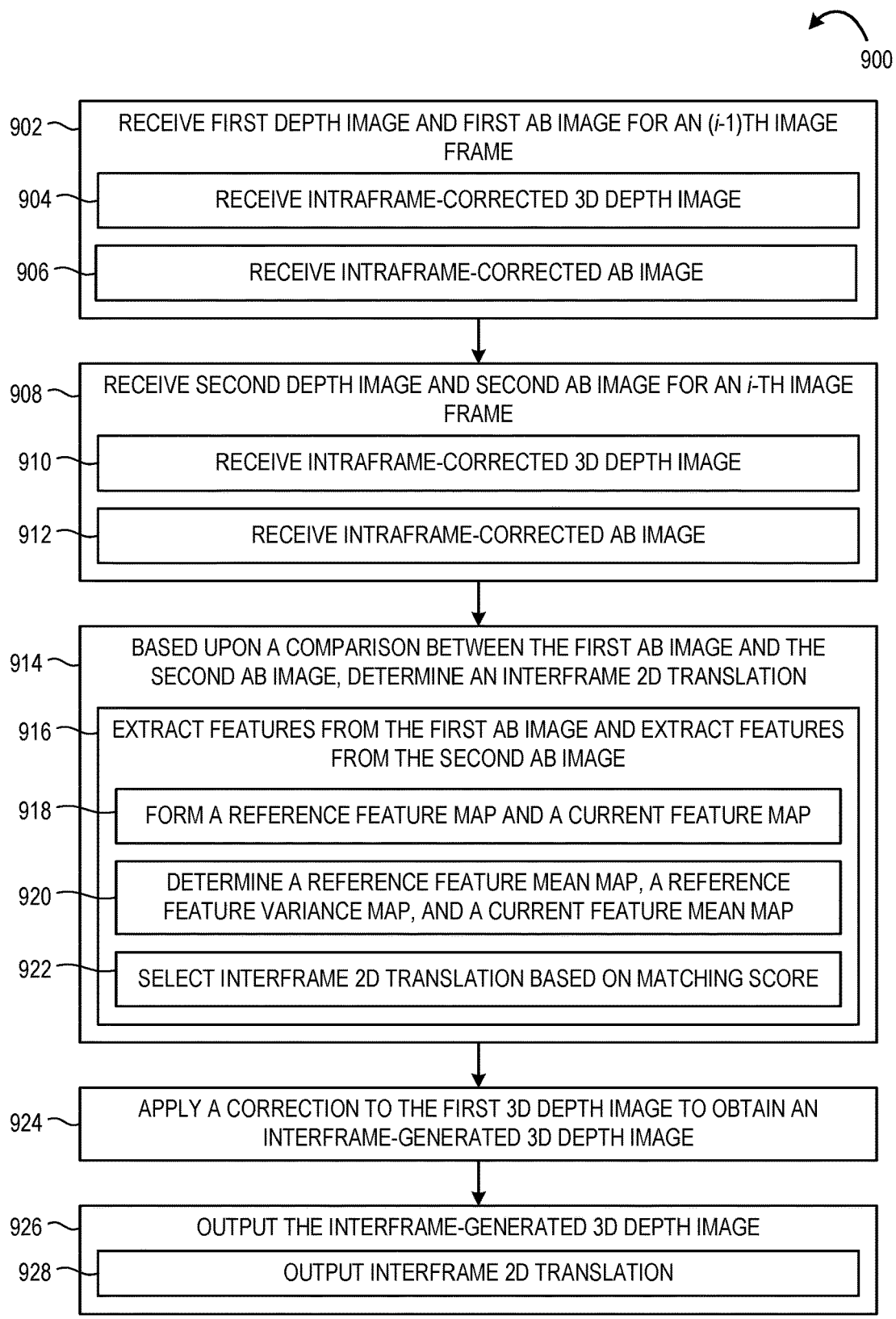
FIG. 9 shows a flow diagram of an example method of performing interframe corrections to form an interframe-generated depth image.

FIG. 9 shows a flow diagram for an example method 900 for determining an interframe 2D translation based on AB data to generate an interframe-generated 3D depth image. At 902, the method comprises receiving a first depth image and first AB image for an $(i-1)^{th}$ image frame. In some examples, at 904, the method comprises receiving an intraframe-corrected 3D depth image. For example, an intraframe-corrected 3D depth image may be formed using method 400. In some examples, at 906, the method comprises receiving an intraframe-corrected AB image. For example, an intraframe-corrected AB image may be formed using method 500.

At 908, the method comprises receiving a second depth image and a second AB image for an $i^{th}$ image frame. In some examples, at 910, the second 3D depth image comprises an intraframe-corrected 3D depth image. In some examples, at 912, the second AB image comprises an intraframe-corrected AB image.

Continuing, at 914, the method further comprises, based at least upon a comparison between the first AB image and the second AB image, determining an interframe 2D translation. In some examples, at 916, the method comprises extracting features from the first AB image and extracting features from the second AB image, and determining the interframe 2D translation further based upon a comparison between the features of the first AB image and features of the second AB image. In some examples, at 918, the method comprises forming a reference feature map and forming a current feature map, and determining the interframe 2D translation based on a comparison between the reference feature map and the current feature map. In some examples at 920, the method comprises determining a reference feature mean map, a reference feature variance map, and a current feature mean map. In some examples, at 922, the method comprises selecting the 2D translation based on a matching score between the current feature mean map and the reference feature mean map. In some examples, the matching score is calculated using:

$$f\left([\Delta u, \Delta v], M_{i,j}^{c'}, M_{i,j}^{R}, \sum_{i,j}^{R}\right) = \sum_{i=1}^{I}\sum_{j=1}^{J} N\left(M_{i,j}^{c'}, M_{i,j}^{R}, \sum_{i,j}^{R}\right)$$

where $M^R$ is the reference mean map, $\Sigma^R$ is the reference variance map, $M^{c'}$ is a translated current feature map translated by $[\Delta u, \Delta v]$, N is a Gaussian distribution probability function, and $f$ is the matching score for the translation $[\Delta u, \Delta v]$.

Method 900 further comprises, at 924, applying a correction to the first 3D depth image to obtain an interframe-generated 3D depth image. At 926, method 900 comprises outputting the interframe-generated 3D depth image. In some examples, at 928, method 900 comprises outputting the interframe 2D translation.

Thus, the disclosed examples may provide for both intraframe and interframe motion blur corrections to ToF depth data. Performing intraframe corrections to depth data prior to phase unwrapping may help avoid unwrapping errors. Further, by utilizing 2D data to estimate camera motion in 2D image space, the examples may be performed computationally efficiently and in real-time. Additionally, determination and application of a 2D translation may be combined with spatial and temporal filtering processes by reusing intermediate processes such as convolutions. As an estimate of camera motion, the determined 2D translations may help enable various post-processing applications such as temporal filters, trajectory estimation, dynamic region estimation, and mapping.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
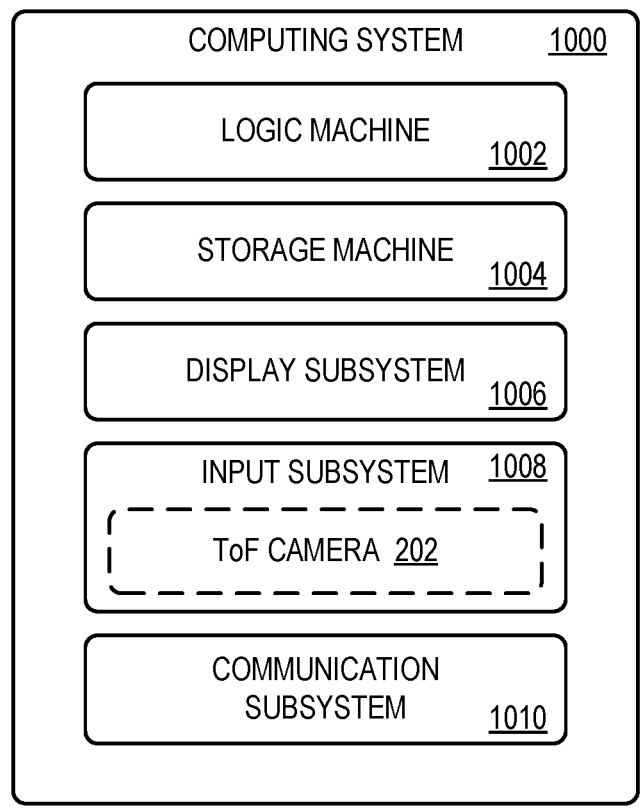
FIG. 10 shows a block diagram of an example computing system.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices.

Computing system 1000 includes a logic machine 1002 and a storage machine 1004. Computing system 1000 may optionally include a display subsystem 1006, input subsystem 1008, communication subsystem 1010, and/or other components not shown in FIG. 10.

Logic machine 1002 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1004 includes one or more physical devices configured to hold instructions executable by the logic machine to implement the methods and processes described herein. When such methods and processes are implemented, the state of storage machine 1004 may be transformed—e.g., to hold different data.

Storage machine 1004 may include removable and/or built-in devices. Storage machine 1004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1004 may include volatile, nonvolatile, dynamic, static, read/write, read-only, random-access, sequential-access, location-addressable, file-addressable, and/or content-addressable devices.

It will be appreciated that storage machine 1004 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1002 and storage machine 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 implemented to perform a particular function. In some cases, a module, program, or engine may be instantiated via logic machine 1002 executing instructions held by storage machine 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1006 may be used to present a visual representation of data held by storage machine 1004. This visual representation may take the form of a graphical user interface (GUI). As the herein described methods and processes change the data held by the storage machine, and thus transform the state of the storage machine, the state of display subsystem 1006 may likewise be transformed to visually represent changes in the underlying data. Display subsystem 1006 may include one or more display devices utilizing virtually any type of technology. Such display devices may be combined with logic machine 1002 and/or storage machine 1004 in a shared enclosure, or such display devices may be peripheral display devices.

When included, input subsystem 1008 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera (e.g., ToF camera 202) for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

Another example provides a depth camera, comprising a time-of-flight (ToF) image sensor configured to acquire depth image data at two or more illumination light modulation frequencies, a logic machine, and a storage machine storing instructions executable by the logic machine to receive depth image data for an image frame from the ToF image sensor, the depth image data comprising phase data for a first modulation frequency and phase data for a second modulation frequency of the two or more illumination light modulation frequencies, the depth image data further comprising active brightness data for the first modulation frequency and active brightness data for the second modulation frequency. The instructions are further executable to, based at least on the active brightness data for the first modulation frequency, determine a first two-dimensional (2D) active brightness image and, based at least on the active brightness data for the second modulation frequency, determine a second 2D active brightness image. The instructions are further executable to determine a 2D translation based at least upon a comparison between the first 2D active brightness image and the second 2D active brightness image, determine corrected phase data based on the 2D translation to form corrected phase data, perform phase unwrapping on the corrected phase data to obtain a three-dimensional (3D) depth image, and output the 3D depth image. In some examples, the instructions executable to determine corrected phase data comprise instructions executable to apply the 2D translation to the phase data for the second modulation frequency. In some such examples, the depth image data additionally or alternatively further comprises phase data and active brightness data for a third modulation frequency, the instructions are further executable to, based at least on the active brightness data for the third modulation frequency, determine a third 2D active brightness image, the 2D translation is a first 2D translation, the instructions are further executable to determine a second 2D translation based upon a comparison between the first 2D active brightness image and the third 2D active brightness image, and the instructions executable to determine corrected phase data comprise instructions executable to apply the first 2D translation to the phase data of the second modulation frequency, and apply the second 2D translation to the phase data for the third modulation frequency. In some such examples, the instructions additionally or alternatively are further executable to apply the 2D translation to the second 2D active brightness image to form a corrected second 2D active brightness image, average the first 2D active brightness image and the corrected second 2D active brightness image to form an intraframe-corrected active brightness image for the image frame, and output the intraframe-corrected active brightness image for the image frame with the 3D depth image. In some such examples, the image frame additionally or alternatively is a first image frame and the intraframe-corrected active brightness image is a first intraframe-corrected active brightness image, and the instructions are further executable to form a second intraframe-corrected active brightness image for a second image frame, based at least upon a comparison between the first intraframe-corrected active brightness image and the second intraframe-corrected active brightness image, determine an interframe translation, based at least upon the interframe translation and the 3D depth image for the first image frame, form an interframe-generated depth image, and output the interframe-generated depth image. In some such examples, the instructions additionally or alternatively further comprise outputting the 2D translation with the 3D depth image. In some such examples, the instructions executable to determine the 2D translation additionally or alternatively comprise instructions executable to extract features from the first 2D active brightness image to form a reference feature map, extract features from the second 2D active brightness image to form a current feature map, apply a translation to the current feature map to form a translated feature map, and determine the 2D translation by using a scoring function to calculate a score between the translated current feature map and the reference feature map, and selecting the 2D translation based on the score. In some such examples, the instructions additionally or alternatively are executable to extract features from the first 2D active brightness image and the second 2D active brightness image by computing a sum of squared differences (SSD) for each pixel of a plurality of active brightness image pixels, the SSD based on a neighborhood of the pixel, and comparing the SSD for each pixel to a threshold.

Another example provides a computing device comprising a logic machine, and a storage machine storing instructions executable by the logic machine to receive input of a first depth image and a first active brightness image, the first depth image and first active brightness image corresponding to a first frame of depth data acquired by a time-of-flight (ToF) camera, and receive input of a second depth image and a second active brightness image, the second depth image and the second active brightness image corresponding to a second frame of depth data acquired by the ToF camera. The instructions are further executable to, based at least upon a comparison between the first active brightness image and the second active brightness image, determine an interframe 2D translation, based at least upon the interframe 2D translation, apply a correction to the second depth image to obtain an interframe-generated depth image, and output the interframe-generated depth image. In some such examples, the first active brightness image comprises a first intraframe-corrected active brightness image, and the second active brightness image comprises a second intraframe-corrected active brightness image. In some such examples, the first depth image additionally or alternatively comprises a first intraframe-corrected depth image, and the second depth image comprises a second intraframe-corrected depth image. In some such examples, the instructions executable to determine the interframe 2D translation additionally or alternatively comprise instructions executable to extract one or more features from the first active brightness image, extract one or more features from the second active brightness image, and determine the interframe 2D translation further based on a comparison of the one or more features extracted from the first active brightness image with the one or more features extracted from the second active brightness image. In some such examples, the instructions additionally or alternatively are further executable to extract features from an image using one or more of a Sobel edge detection algorithm, a Canny edge detection algorithm, or a sum of squared differences (SSD) threshold. In some such examples, the instructions additionally or alternatively are executable to form a reference feature map from the one or more features extracted from the first active brightness image, and form a current feature map from the one or more features extracted from the second active brightness image, and determine the interframe 2D translation based upon a comparison between the reference feature map and the current feature map. In some such examples, the instructions additionally or alternatively are further executable to determine a reference feature mean map based on a neighborhood average for each pixel in the reference feature map, determine a current feature mean map based on a neighborhood average for each pixel in the current feature map, and determine the interframe 2D translation by selecting a translation based upon a matching score between the current feature mean map and the reference feature mean map. In some such examples, the instructions additionally or alternatively are executable to calculate the matching score between the current feature mean map and the reference feature mean map using $$f = \sum_{i=1}^{I}\sum_{j=1}^{J} N\left(M_{i,j}^{c'}, M_{i,j}^{R}, \sum_{i,j}^{R}\right)$$

where I and J are grid dimensions, $M^{c'}$ is the current feature mean map translated by $[\Delta u, \Delta v]$, $M^R$ is the reference feature mean map, $\Sigma^R$ is a variance map for the reference feature map, N is a Gaussian distribution probability function, and $f$ is the matching score for the translation $[\Delta u, \Delta v]$.

Another example provides a method for correcting motion blur in three-dimensional (3D) depth data, the method comprising receiving depth image data for an image frame from a ToF image sensor, the depth image data comprising phase data for a first modulation frequency and a second modulation frequency, the depth image data further comprising active brightness data for the first modulation frequency and the second modulation frequency, based at least on the active brightness data for the first modulation frequency, determining a first two-dimensional (2D) active brightness image, and, based at least on the active brightness data for the second modulation frequency, determining a second 2D active brightness image. The method further comprises determining an intraframe 2D translation based at least upon a comparison between the first 2D active brightness image and the second 2D active brightness image, determining intraframe-corrected phase data based on the intraframe 2D translation to form intraframe-corrected phase data, performing phase unwrapping on the intraframe-corrected phase data to obtain an intraframe-corrected three-dimensional (3D) depth image for the image frame, and outputting the intraframe-corrected 3D depth image for the image frame. In some such examples, the image frame is an $(i-1)^{th}$ image frame, the intraframe-corrected 3D depth image is an $(i-1)^{th}$ intraframe-corrected 3D depth image, and the method further comprises, based at least upon the 2D translation, the active brightness data for the first modulation frequency, and the active brightness data for the second modulation frequency, determining an intraframe-corrected active brightness image for the $(i-1)^{th}$ image frame, receiving depth image data for an $i^{th}$ image frame from the ToF image sensor, determining an intraframe-corrected active brightness image for the $i^{th}$ image frame, determining intraframe-corrected phase data for the $i^{th}$ image frame, performing phase unwrapping on the motion-corrected phase data for the $i^{th}$ image frame to obtain an $i^{th}$ intraframe-corrected three-dimensional (3D) depth image, determining an interframe 2D translation based at least upon the intraframe-corrected active brightness image for the $i^{th}$ image frame and the intraframe-corrected active brightness image for the $(i-1)^{th}$ image frame, based at least upon the interframe 2D translation and the intraframe-corrected 3D depth image for the $(i-1)^{th}$ image frame, forming an interframe-generated depth image, and outputting the interframe-generated interframe depth image. In some such examples, the method additionally or alternatively further comprises extracting one or more features from the first 2D active brightness image to form a reference feature map, and extracting one or more features from the second 2D active brightness image to form a current feature map, wherein determining the intraframe 2D translation comprises selecting a translation based on a matching score between the reference feature map and the current feature map. In some such examples, selecting the translation based on the matching score additionally or alternatively comprises selecting the translation using a steepest gradient method.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A depth camera, comprising:
a time-of-flight (ToF) image sensor configured to acquire depth image data at two or more illumination light modulation frequencies;
a logic machine; and
a storage machine storing instructions executable by the logic machine to
receive depth image data for an image frame from the ToF image sensor, the depth image data comprising phase data for a first modulation frequency and phase data for a second modulation frequency of the two or more illumination light modulation frequencies, the depth image data further comprising active brightness data for the first modulation frequency and active brightness data for the second modulation frequency,
based at least on the active brightness data for the first modulation frequency, determine a first two-dimensional (2D) active brightness image,
based at least on the active brightness data for the second modulation frequency, determine a second 2D active brightness image,
determine an intraframe 2D translation based at least upon a comparison between the first 2D active brightness image and the second 2D active brightness image,
determine corrected phase data based on the intraframe 2D translation to form corrected phase data,
perform phase unwrapping on the corrected phase data to obtain a three-dimensional (3D) depth image, and
output the 3D depth image.

2. The depth camera of claim 1, wherein the instructions executable to determine corrected phase data comprise instructions executable to apply the intraframe 2D translation to the phase data for the second modulation frequency.

3. The depth camera of claim 1, wherein the depth image data further comprises phase data and active brightness data for a third modulation frequency,
wherein the instructions are further executable to, based at least on the active brightness data for the third modulation frequency, determine a third 2D active brightness image,
wherein the intraframe 2D translation is a first intraframe 2D translation,
wherein the instructions are further executable to determine a second intraframe 2D translation based upon a comparison between the first 2D active brightness image and the third 2D active brightness image, and
wherein the instructions executable to determine corrected phase data comprise instructions executable to apply the first intraframe 2D translation to the phase data of the second modulation frequency, and apply the second intraframe 2D translation to the phase data for the third modulation frequency.

4. The depth camera of claim 1, wherein the instructions are further executable to
apply the intraframe 2D translation to the second 2D active brightness image to form a corrected second 2D active brightness image,
average the first 2D active brightness image and the corrected second 2D active brightness image to form an intraframe-corrected active brightness image for the image frame, and
output the intraframe-corrected active brightness image for the image frame with the 3D depth image.

5. The depth camera of claim 4, wherein the image frame is a first image frame and the intraframe-corrected active brightness image is a first intraframe-corrected active brightness image, and wherein the instructions are further executable to
form a second intraframe-corrected active brightness image for a second image frame,
based at least upon a comparison between the first intraframe-corrected active brightness image and the second intraframe-corrected active brightness image, determine an interframe translation,
based at least upon the interframe translation and the 3D depth image for the first image frame, form an interframe-generated depth image, and
output the interframe-generated depth image.

6. The depth camera of claim 1, wherein the instructions further comprise outputting the intraframe 2D translation with the 3D depth image.

7. The depth camera of claim 1, wherein the instructions executable to determine the 2D translation comprise instructions executable to
extract features from the first 2D active brightness image to form a reference feature map,
extract features from the second 2D active brightness image to form a current feature map,
apply a translation to the current feature map to form a translated current feature map, and
determine the intraframe 2D translation by using a scoring function to calculate a score between the translated current feature map and the reference feature map, and selecting the intraframe 2D translation based on the score.

8. The depth camera of claim 7, wherein the instructions are executable to extract features from the first 2D active brightness image and the second 2D active brightness image by computing a sum of squared differences (SSD) for each pixel of a plurality of active brightness image pixels, the SSD based on a neighborhood of the pixel, and comparing the SSD for each pixel to a threshold.

9. A method for correcting motion blur in three-dimensional (3D) depth data, the method comprising:
receiving depth image data for an image frame from a ToF image sensor, the depth image data comprising phase data for a first modulation frequency and a second modulation frequency, the depth image data further comprising active brightness data for the first modulation frequency and the second modulation frequency,
based at least on the active brightness data for the first modulation frequency, determining a first two-dimensional (2D) active brightness image,
based at least on the active brightness data for the second modulation frequency, determining a second 2D active brightness image,
determining an intraframe 2D translation based at least upon a comparison between the first 2D active brightness image and the second 2D active brightness image,
determining intraframe-corrected phase data based on the intraframe 2D translation to form intraframe-corrected phase data,
performing phase unwrapping on the intraframe-corrected phase data to obtain an intraframe-corrected three-dimensional (3D) depth image for the image frame, and
outputting the intraframe-corrected 3D depth image for the image frame.

10. The method of claim 9, wherein the image frame is an $(i-1)^{th}$ image frame, the intraframe-corrected 3D depth image is an (i−1)$^{th}$ intraframe-corrected 3D depth image, and the method further comprising:

based at least upon the 2D translation, the active brightness data for the first modulation frequency, and the active brightness data for the second modulation frequency, determining an intraframe-corrected active brightness image for the (i−1)$^{th}$ image frame;

receiving depth image data for an i$^{th}$ image frame from the ToF image sensor;

determining an intraframe-corrected active brightness image for the i$^{th}$ image frame;

determining intraframe-corrected phase data for the i$^{th}$ image frame;

performing phase unwrapping on the motion-corrected phase data for the i$^{th}$ image frame to obtain an i$^{th}$ intraframe-corrected three-dimensional (3D) depth image, determining an interframe 2D translation based at least upon the intraframe-corrected active brightness image for the i$^{th}$ image frame and the intraframe-corrected active brightness image for the (i−1)$^{th}$ image frame;

based at least upon the interframe 2D translation and the intraframe-corrected 3D depth image for the (i−1)$^{th}$ image frame, forming an interframe-generated depth image; and outputting the interframe-generated depth image.

11. The method of claim 9, further comprising:

extracting one or more features from the first 2D active brightness image to form a reference feature map, and extracting one or more features from the second 2D active brightness image to form a current feature map, wherein determining the intraframe 2D translation comprises selecting a translation based on a matching score between the reference feature map and the current feature map.

12. The method of claim 11, wherein selecting the translation based on the matching score comprises selecting the translation using a steepest gradient method.

\* \* \* \* \*